Sept. 29, 1970        J. T. RODDY        3,531,070
MOTOR MOUNTING
Filed June 18, 1969
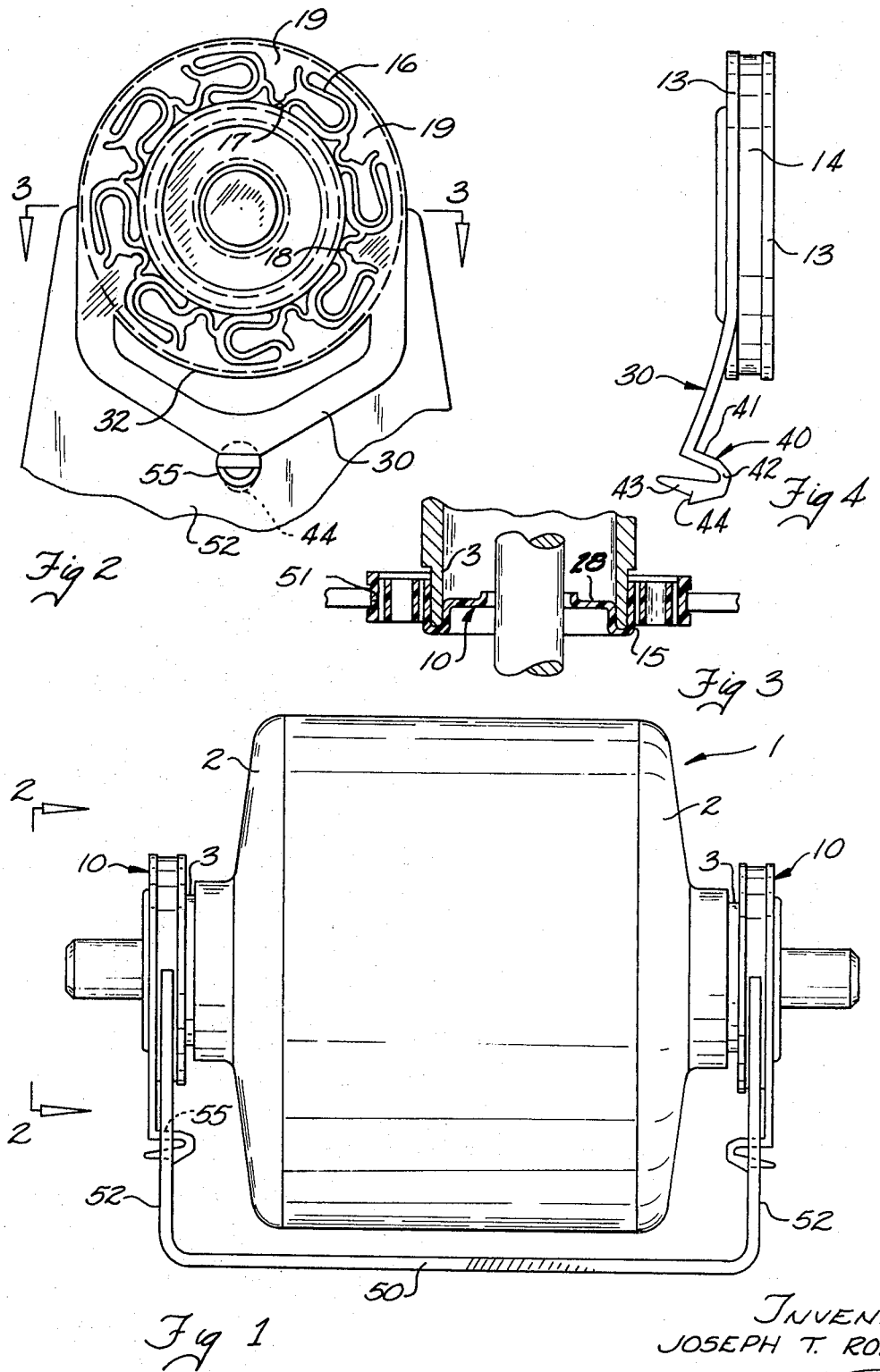

United States Patent Office 3,531,070
Patented Sept. 29, 1970

3,531,070
MOTOR MOUNTING
Joseph T. Roddy, Ballwin, Mo., assignor to Emerson Electric Co., St. Louis, Mo., a corporation of Missouri
Filed June 18, 1969, Ser. No. 834,374
Int. Cl. F16f 15/00
U.S. Cl. 248—15 5 Claims

ABSTRACT OF THE DISCLOSURE

In an electric motor mounting wherein an electric motor is supported by a mounting ring and a bracket having broad sides, a tongue is connected to the mounting ring and bracket and extends homeoplanarly with a broad side of the bracket. In an illustrative embodiment the bracket is sheet metal with an open-mouthed saddle in which the mounting ring is seated and the tongue extends in a direction away from the mouth of the saddle, the tongue and broad side having complementary anchoring means for fastening the tongue to the broad side.

CROSS REFERENCE TO RELATED APPLICATION

This application is concerned with some of the subject matter of applicant's application, Ser. No. 727,202, filed May 7, 1968.

BACKGROUND OF THE INVENTION

This invention relates to an electric motor mounting wherein a shock absorbing motor mounting ring, either formed as an integral unit, as in the device shown in my application, Ser. No. 727,202, or as a composite of metal and rubber-like material as is the device described in an application of Boden and Krueger, Ser. No. 702,102, filed Dec. 27, 1966, is mounted on a sheet metal bracket.

It has been customary in the mounting of motor mounting rings in a saddle of a sheet metal bracket to use metal clips, connected to hooks on the sheet metal bracket at one end and joined by a nut and bolt at the other end. In one embodiment of the device of my application Ser. No. 727,202, I have shown straps or bands made integral with the mounting ring, which snap over the hooks which are normally provided for the metal separate straps. Even in the latter arrangement, it was necessary to use a certain amount of manual dexterity and strength, because the straps had to be pulled over the nose of the hook.

One of the objects of this invention is to provide a mounting arrangement in which the amount of labor involved in the installation of the mounting ring is minimal.

Another object is to provide such a mounting arrangement which is economical to manufacture and effective and reliable in use.

Other objects will become apparent to those skilled in the art in the light of the following description and accompanying drawings.

SUMMARY OF THE INVENTION

In accordance with this invention, generally stated, in an electric motor mounting wherein an electric motor, supported by a mounting ring and a bracket having broad sides, the mounting ring having an outer rim or band and a resilient intermediate section and embracing a hub of the motor, a tongue is provided connected to the mounting ring and bracket and extending homeoplanarly with a broad side of the bracket.

In the preferred embodiment, the bracket is made of sheet metal, with an open-mouthed saddle in which the mounting ring is seated, and the tongue extends from the ring in a direction away from the open mouth of the saddle to a place spaced from the saddle, and complementary anchoring means are provided on the tongue and on the broad side for fastening the tongue to the broad side.

In the preferred embodiment, the tongue is made integral with the outer band of the mounting ring and is connected to the outer band at two spaced places and unattached thereto between those places. In the preferred embodiment, the anchoring means on the tongue is a split thimble and the complementary means on the surface of the bracket is an edge defining a hole through which the thimble projects.

BRIEF DESCRIPTION OF THE DRAWING

In the drawing,
FIG. 1 is a view in side elevation of one embodiment of motor mounting of this invention;
FIG. 2 is a fragmentary view in end elevation in the direction indicated by 2—2 in FIG. 1;
FIG. 3 is a sectional view taken along a line 3—3 of FIG. 2; and
FIG. 4 is a view in side elevation of a mounting ring part of the motor mounting shown in FIGS. 1–3, before installation.

DESCRIPTION OF THE PREFERRED EMBODIMENTS

Referring now to the drawing, reference numeral 1 indicates an electric motor having end shields 2, on which are cylindrical bosses 3, on which mounting rings 10 are tightly mounted. The mounting rings 10 of this embodiment are molded in one piece. Each has an outer circular rim or band portion 13, with a peripheral groove 14, a central circular hub portion 15, and resilient connecting members 16 between the central hub 15 and the rim 13.

Sockets 17 integral with the hub portion 15 are positioned complementarily to ties 18 of bumper members 19 integral with the rim 13. The function of the toe and socket arrangement is to limit the amount of radial and circumferential movement of the rim relative to the hub. It will be observed that the toes 18 are caged circumferentially by the socket-defining projections of the hub.

A yoke-shaped tongue 30 is integral with the rim 13 along one side of the groove 14 at two symmetrically spaced areas along the rim. The tongue 30 is free of attachment through an area of the rim designated by the reference numeral 32.

In the center of the tongue with respect to the areas of attachment, the tongue is provided with an integral split thimble 40, which projects in a direction toward the motor. The thimble 40 has an upper leg 41 integrally attached to the yoke section of the tongue 30, a nose portion 42, an outer leg 43, somewhat longer than the leg 41 and tapered toward its outer end, and a catch lip 44 projecting outwardly from the outer leg 43. The yoke section of the tongue 30 is formed to tend away from the plane of the radially broad faces of the ring, as shown particularly in FIG. 4.

The hub portion 15 is proportioned to fit tightly on the boss 3, as shown particularly in FIG. 3.

In this embodiment, the hub portion has integral with it a closure wall 28. The closure wall 28 forms a bearing cap to inhibit the entrance of dust or the like. Also, the reentrant arrangement of the wall provides a substantial surface engaging the inside wall of the boss 3 as well as the outside wall, forming a double seal around the boss and putting substantially more area in frictional engagement between hub portion 15 and boss 3 than would be provided if only the outside surface of the boss were engaged.

A sheet metal bracket 50, U-shaped in side elevation, is provided with the usual open-mouthed saddle 51, in which the mounting ring seats. The bracket 50 has the usual broad-faced leg portions 52. In this embodiment, each of the legs 52 is provided with a hole 55 through which the nose of the thimble 40 projects. The size of the hole is such that when the outer leg 43 of the thimble is moved toward the leg 41, the catch lip 44 will pass through the hole, but when the leg 43 moves to its normal position, the lip 44 engages the inner side of the leg 52 of the bracket 50.

In mounting a motor, the hub portion 15 is pressed onto the boss 3 tightly enough to insure that in use there is no radial or axial displacement of the hub with respect to the boss. Under certain conditions of use it may be necessary or desirable to provide splines on the hub and boss, or annular beads. The hub can even be cemented to the boss. However, these are expedients of the art and do not form a part of the present invention.

The thimbles are aligned with the respective holes in the bracket legs. The motor is set into place within the compass of the legs 52 until the rings 10 seat in the saddle of the legs. The tongues 30 are pushed toward the legs until the thimbles 40 go through the holes 55. The camming action of the sloping outer surface of the lip 44 is usually effective to cam the leg 43 toward the leg 41 to permit the lip to clear the edge of the hole and snap out to engage the inner surface of the leg 52. If necessary, the leg 43 can be squeezed toward the leg 41 manually or with a tool. The motor is then fully mounted.

The embodiment described is preferably formed as a unitary casting of plastic material such as nylon to which glass fibers have been added. The amount of flexibility which is required or which can be tolerated will determine the type of plastic and the amount of reinforcement. Merely by way of illustration, a Type 6 nylon, containing 30% glass, has been found to be satisfactory.

Numerous variations in the construction of the motor mounting of this invention, within the scope of the appended claims will occur to those skilled in the art in the light of the foregoing disclosure.

Merely by way of example, the tongue 30 can be attached to the rim 13 in a continuous area. The yoke arrangements provides greater flexibility. The anchoring means can be reversed, with an aperture provided in a tab on the tongue and the thimble by a lanced out or otherwise provided projection on the bracket. The tongue can be made integral with or securely fastened to a rim which is a different material from the resilient intermediate part of the ring, e.g., a brass or plastic rim and a rubber intermediate ring. Two tongues, one at each side of the rim can be provided, with thimbles offset from one another with corresponding holes in the bracket so that a tongue can be mounted from either side, or both tongues secured at once. These are merely illustrative. The rim may be provided with ears to embrace two edges of the saddle, and with lugs projecting radially. The ring can then be used in the conventional manner, the tongue being removed if necessary. If the base is made of plastic of the same character as the ring, the tongue can be made integral with the base and ring, the rim of the ring defining the "saddle" area of the base and the leg of the base forming the tongue part of the ring. It will be observed, however, that in this integral construction the tongue is still homeoplanar with the broad side of the base leg, the term "homeoplanar" being used to embrace the same plane as well as parallel planes.

Having thus described the invention, what is claimed and desired to be secured by Letters Patent is:

1. In an electric motor mounting wherein an electric motor is supported by a mounting ring and a bracket having at least one leg with a broad side, the mounting ring having an outer rim and a resilient intermediate section and embracing a hub of said motor, the improvement comprising a tongue, connected to said mounting ring and bracket, and extending homeoplanarly with said broad side of said leg.

2. The improvement of claim 1 wherein the tongue is integral with the outer rim of said ring.

3. In an electric motor mounting wherein an electric motor is supported by a sheet metal bracket having broad sides and provided with an open-mouthed saddle in which a mounting ring is seated, the mounting ring having an outer band and a resilient intermediate section and embracing a hub of said motor, the improvement comprising a tongue connected to said mounting ring and extending in a plane parallel to and along one of said broad sides in a direction away from the open mouth of said saddle to a place spaced from said saddle, and complementary anchoring means on said tongue and broad side for fastening said tongue to said broad side.

4. The improvement of claim 3 wherein the tongue is yoke-shaped and attached to the outer band at two spaced places and unattached thereto between said places.

5. The improvement of claim 3 wherein the anchoring means on the tongue is a split thimble and the complementary means in the broad surface of the bracket is an edge defining a hole through which the thimble projects.

References Cited

UNITED STATES PATENTS

| | | | |
|---|---|---|---|
| 2,209,477 | 7/1940 | Reibel | 310—51 |
| 2,803,416 | 8/1957 | Berlien | 248—26 |
| 3,323,763 | 6/1967 | Butts | 248—15 |
| 3,394,908 | 7/1968 | Irvin | 248—26 |

MILTON O. HIRSHFIELD, Primary Examiner

R. SKUDY, Assistant Examiner

U.S. Cl. X.R.

248, 26; 310, 91